April 7, 1936.　　　　S. M. ANDERSON　　　　2,036,672
AIR CONDITIONING SYSTEM
Filed April 17, 1935　　　2 Sheets-Sheet 2
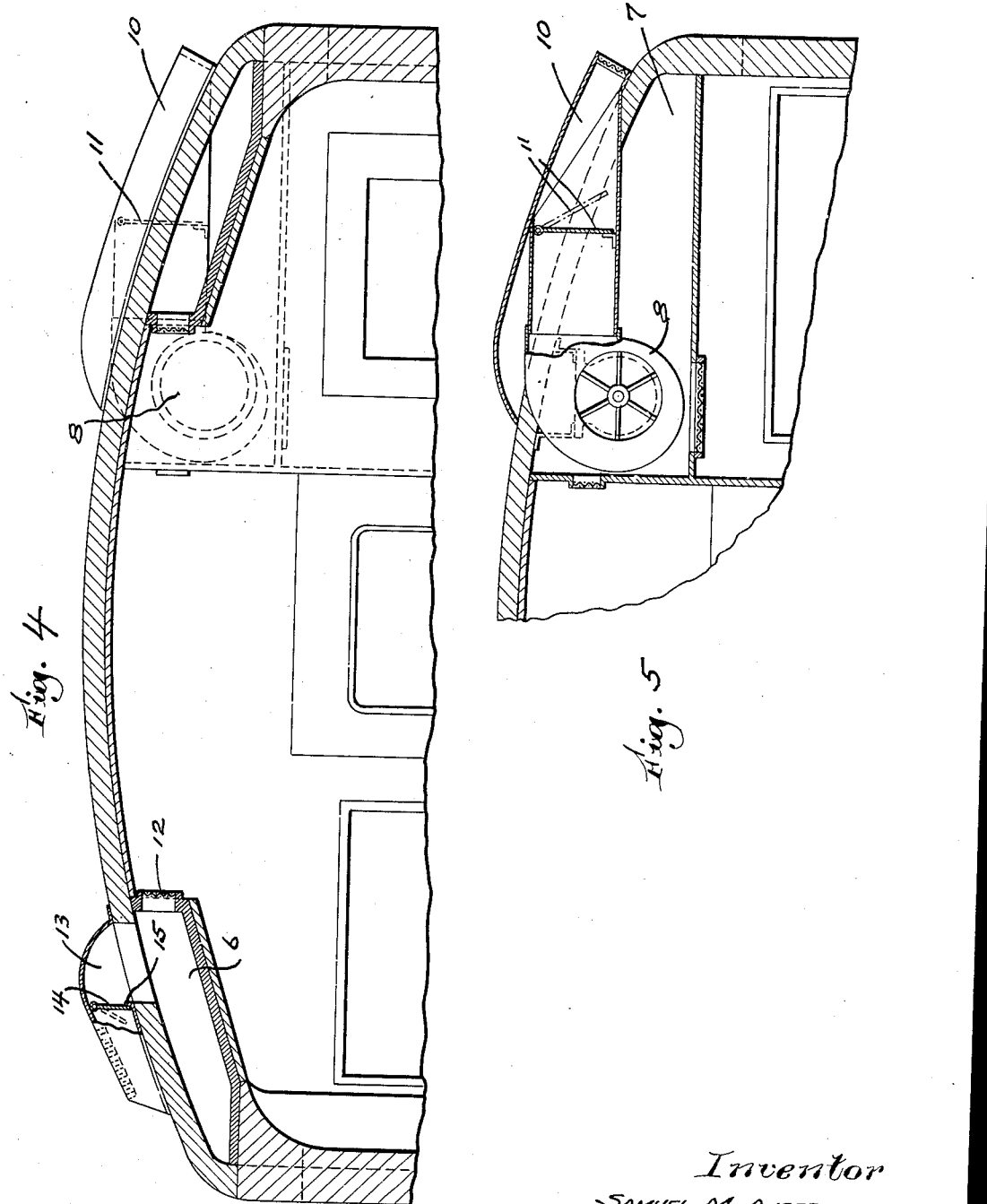
Inventor
SAMUEL M. ANDERSON
by Robert T. Palmer
Attorney Patented Apr. 7, 1936

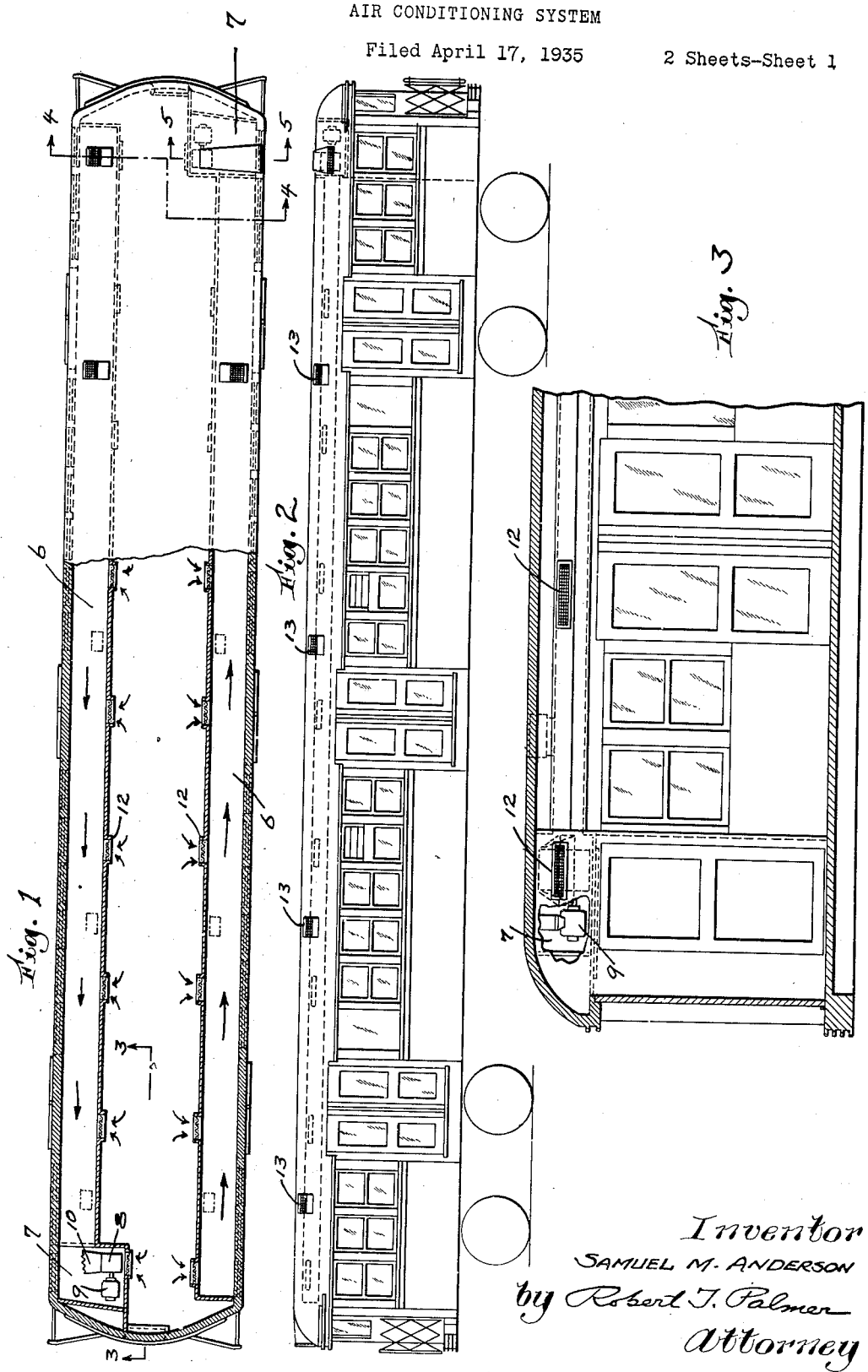

2,036,672

UNITED STATES PATENT OFFICE 2,036,672

AIR CONDITIONING SYSTEM

Samuel M. Anderson, Sharon, Mass., assignor to B. F. Sturtevant Company, Inc., Boston, Mass.

Application April 17, 1935, Serial No. 16,774

2 Claims. (Cl. 98—20)

This invention relates to the ventilation of moving vehicles and relates more particularly to the ventilation of what are known as rapid transit passenger cars.

Due to the large number of passengers, especially during rush hours, in rapid transit cars, of the subway, elevated or interurban type, it is essential that adequate ventilation be provided for. Heretofore, several fans to a car, which agitate the air in the passenger space have been provided, but no adequate provision for the positive exhaust of vitiated air has been provided nor has any provision for ventilation in the event of failure of the fans been provided for.

According to this invention, longitudinal exhaust ducts overhead the passenger space are provided and which contain a plurality of spaced inlet openings communicating with the passenger space into which air from the passenger space is drawn in by the suction action of power driven blowers which exhaust the air to the atmosphere external the car.

According to a feature of this invention, each blower has provided in its air discharge passage, an automatically operated damper which closes off the air discharge passage when the blower is not operating but opens up this passage when the blower is operating. Each of the longitudinal ducts is provided with auxiliary exhaust outlets connecting with the atmosphere external the car, each of these outlets being equipped with a damper which opens when the blower connected to the duct is not operating. These auxiliary exhaust outlets are so arranged with respect to the external surface of the car that the movement of air past the car when it is in motion induces the outward flow of air from the duct through the auxiliary outlets; the dampers for the auxiliary outlets being closed during operation of the blower.

Thus, when the blower associated with each duct is operating, its associated damper is opened, permitting the blower to draw in air from the passenger space into the duct and to discharge it to the atmosphere. When the blower fails to operate for any reason during movement of the car, its associated damper closes and the dampers associated with the auxiliary outlets open, causing outward movement of exhaust air to the atmosphere through the auxiliary exhaust outlets.

An object of the invention is to provide means for the positive exhaust of air under forced draft from a passenger car to the atmosphere.

Another object of the invention is to provide a blower for exhausting air from a passenger car and to provide auxiliary means actuated through movement of the car for causing the exhaust of air from the car in the event of failure of the blower.

Other objects of the invention will be apparent from the following description taken together with the drawings.

The invention will now be described with reference to the drawings of which:

Fig. 1 is a plan view looking downwardly with a portion in section and a portion in dotted outline of a railway car equipped according to this invention;

Fig. 2 is a side view of the car of Fig. 1;

Fig. 3 is an enlarged sectional view along the lines 3—3 of Fig. 1;

Fig. 4 is a sectional view along the lines 4—4 of Fig. 1; and,

Fig. 5 is a sectional view along the lines 5—5 of Fig. 1.

The ventilating arrangement according to this invention comprises one or more longitudinal ducts 6, extending lengthwise of the car above the passenger space. Where two ducts are used as shown by the drawings, one of the ducts 6, opens into a blower compartment 7, at one end of the car, and the other of the ducts 6, opens into a blower compartment at the other end of the car, the two blower compartments 7, being located diagonally opposite each other. Within each blower compartment 7, is a blower 8 adapted to be rotated by an electric motor 9, which may be energized from the car lighting system or any other suitable source. The suction side of the blower connects directly with the space in the blower chamber 7, the discharge side of which is connected to the air discharge duct 10 which extends through an opening in the car roof, as shown more clearly by Figs. 4 and 5.

The air discharge duct 10 contains the rotatably supported damper 11 which is so arranged that when its associated blower 8 is operating, the air exhausted by the blower, forces the damper 11 to an open position permitting the exhaust of air through the duct 10. When the blower 8 is not operating, due to the absence of pressure against the inner side of the damper 11, it swings to a closed position, closing off the duct 10 and preventing atmospheric air from external the car from entering the car through the duct 10.

The longitudinal ducts 6 are provided with a plurality of spaced air inlet openings 12 through which vitiated air from the passenger space enters the exhaust ducts 6, and is afterwards exhausted to the atmosphere.

The ducts 6 are also provided with a plurality of auxiliary discharge outlet openings 13, which connect with the atmosphere external the car and which are so arranged on the exterior of the car, as shown more clearly by Fig. 4, that air movement past them, induces the flow of exhaust air from the ducts 6 to the atmosphere through these auxiliary discharge outlet openings.

Each of the auxiliary outlet openings 13 contains a rotatably attached damper 14 which, when the blowers 8 are operating, closes off the discharge outlets 13 due to the tendency of the air under the suction force of the blower, to move the damper 14 against its seat 15 as shown by the full lines of Fig. 4.

When, however, the blowers 8 are not operating and the car is in motion, the movement of the air past the exhaust openings 13 induces the outward flow of air from the ducts 6 past the dampers 14, causing them to swing outwardly in the absence of the suction force exerted when the blowers are in operation, thus permitting the exhaust of air from the ducts 6 through the outlet openings 13.

In the embodiment of the invention described, no structural provision has been shown for the intake of fresh outside air, this because in this embodiment, the stops of the car are frequent with the result that the large number of doors illustrated, are opened frequently so that sufficient fresh air for ventilation purposes enters through the doors when opened and through cracks and crevices in the car at other times. The principles of this invention could, however, be applied to a car where provision is made for intaking fresh air through one or more openings provided for this purpose.

It should be understood, furthermore, that the air which is moved according to this invention may be conditioned by filtering, heating or cooling, as desired, in an auxiliary air conditioning system, which in such an event, could be used in association with the present invention.

Whereas, one embodiment of the invention has been described for the purpose of illustration, it should be understood that the invention is not limited to the exact arrangement described, since many departures would suggest themselves to those skilled in the art after having had access to this disclosure.

What is claimed is:

1. A ventilating system for a railway passenger car comprising a longitudinal duct, a plurality of spaced air inlet openings connecting said duct with the passenger space of said car, a blower, means connecting the inlet side of said blower to said duct and the outlet side of said blower to the atmospheric air external said car, a plurality of spaced air exhaust openings in said duct connecting with the atmospheric air external said car, and means for closing off said exhaust openings when said blower is operating.

2. A ventilating system for a railway passenger car comprising a longitudinal duct, a plurality of spaced air inlet openings connecting said duct with the passenger space of said car, a blower, means connecting the inlet side of said blower to said duct and the outlet side of said blower to the atmospheric air external said car, a plurality of spaced air exhaust openings in said duct connecting with the atmospheric air external said car closed when said blower is operating, and means for closing off the outlet side of said blower from the atmosphere and for opening said exhaust openings when said blower is not operating.

SAMUEL M. ANDERSON.